United States Patent
Boegelund

(10) Patent No.: US 6,931,603 B2
(45) Date of Patent: Aug. 16, 2005

(54) METHOD AND SYSTEM FOR APPENDING INFORMATION TO GRAPHICAL FILES STORED IN SPECIFIC GRAPHICAL FILE FORMATS

(75) Inventor: Flemming Boegelund, Frederikssund (DK)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 09/998,045

(22) Filed: Nov. 29, 2001

(65) Prior Publication Data

US 2003/0098877 A1 May 29, 2003

(51) Int. Cl.[7] ................................................ G06F 3/00
(52) U.S. Cl. .................... 715/846; 715/764; 715/716; 715/512; 715/501.1
(58) Field of Search .................... 345/764, 854, 345/716, 846, 835, 730, 732, 731, 847, 808, 760, 738, 748; 715/512, 501.1, 530, 514, 515, 520; 382/232, 243, 248, 250, 233

(56) References Cited

U.S. PATENT DOCUMENTS

| | | | | |
|---|---|---|---|---|
| 5,841,978 A | * | 11/1998 | Rhoads | 345/760 X |
| 6,052,486 A | * | 4/2000 | Knowlton et al. | 382/232 |
| 6,356,921 B1 | * | 3/2002 | Kumar et al. | 715/501.1 |
| 6,859,909 B1 | * | 2/2005 | Lerner et al. | 715/512 |
| 2002/0196272 A1 | * | 12/2002 | Ramos et al. | 345/738 |
| 2004/0080525 A1 | * | 4/2004 | Miller et al. | 345/716 |

* cited by examiner

Primary Examiner—Raymond J. Bayerl
(74) Attorney, Agent, or Firm—David Mims; Darcell Walker

(57) ABSTRACT

The present invention provides a method and system to append information to an image file containing a stored graphical image. The appended information relates to the contents of the graphical image. In the process of the present invention, there is an initial graphical file containing a stored image. During the creation of the graphical file (such as a PowerPoint file or Freelance Graphics file), the user can insert images, other objects or text onto the file. Some of the objects can be hyperlinks (referred to as "Hotspots") to other files or other system resources. The graphical software stores information related to every object on the graphical file. During the process of converting a graphical image to a graphical image file format such as a JPEG file, the present invention takes the information concerning 'Hotspot' or other objects on the file on the graphical file and generates an appendix to the created graphical image file containing this 'Hotspots' information. In this process, the method of the present invention first reads the original length of the JPEG file. The present invention then attaches the appendix containing the 'Hotspots' information to the JPEG file. By this the length of the JPEG file is modified to show the addition of the attached information.

15 Claims, 9 Drawing Sheets

| Hotspot Parameter | Type, size | Values |
|---|---|---|
| Length | S,8 | '00000xxx' |
| Type | S,2 | '01' |
| X1 | S,4 | |
| Y1 | S,4 | |
| X2 | S,4 | |
| Y2 | S,4 | |
| URL Length | S,4 | |
| URL | S | |

FIG. 9

| Hotspot Parameter | Type, size | Values |
|---|---|---|
| Length | S,8 | '00000064' |
| Type | S,2 | '01' |
| X1 | S,4 | '0264' |
| Y1 | S,4 | '0512' |
| X2 | S,4 | '0606' |
| Y2 | S,4 | '0535' |
| URL Length | S,4 | '0042' |
| URL | S | '7652cedc868ef6c12568bd0036a0f5a274.html |

FIG. 10

| Hotspot Parameter | Type, size | Values |
|---|---|---|
| Length | S,8 | '00000xxx' |
| Type | S,2 | '02' |
| File name length | S,4 | |
| File name | S,4 | |
| File data | S,4 | |

FIG. 11

METHOD AND SYSTEM FOR APPENDING INFORMATION TO GRAPHICAL FILES STORED IN SPECIFIC GRAPHICAL FILE FORMATS

FIELD OF THE INVENTION

This invention relates to a method and system for appending information to a graphical image file in order to simplify the transmission, storage and distribution of certain information related to the image, and in particular to a method and system for appending information related to the graphical contents of a presentation slide to the end of the presentation slide file which can be stored in a file repository in a graphical file format.

BACKGROUND OF THE INVENTION

The World Wide Web, also referred to as the Internet, is a global computing environment in which all types information that is accessible from the Internet can be accessed in a consistent and simple way by using a standard set of naming and accessing conventions. Internet users can access computing sites all over the world from one location. A user can connect from his/her machine to thousands of Web servers simply by "clicking" on an image or by entering a specific address. Users can connect to many different types of systems and not be aware of the system differences. Users can also access many different types of information such as text, images, audio, video and computational services. The user can perform all of these tasks using a single web-browser that can access this information. The ability to access information via the Internet is the result of hotspots (hyperlinks) that connect this seemingly infinite body of information together. A hotspot is text or an image in a web site that can be accessed in order to have some action performed. During this process of accessing a hotspot, the user typically moves a pointing device such as a mouse over certain areas referred to as hotspots, then clicks the mouse to signal the initialization of the desired action.

In a computing environment, there are many graphical displays that appear on a user's machine. There are countless types of displays in any computing environment and include typical displays such as web pages and presentation slides. These displays also contain information related to the nature of the particular display. The pieces of information on a display can be referred to as objects and can include text, charts, graphs and pictorial_images. Each display contains one or more of these objects. Each display also contains information about the objects contained on the display. This information includes information about any hotspot (hyperlink) objects contained on the display. This additional information is created by software during the creation of the display and is stored such that the information is transparent to the user or viewer of the display.

In many cases, the displays may be part of a larger set of displays. This situation is often seen with presentation slides. Slide presentations can contain multiple slides that are presented in a predetermined sequence. In these cases, it is sometimes necessary to transport the entire set of slides or to store the entire set of slides. During the transportation or storage of graphical displays it may be necessary or desired, to convert the displays to a compressed form in order to save storage space or to facilitate faster transport.

One standard for compression of still images is referred to as the JPEG standard. The Joint Photographic Experts Group (JPEG) has promulgated a standard for still image compression, which employs a Discrete Cosine Transform-based algorithm. The JPEG standard is described in a number of publications. FIG. 1 describes the basic JPEG image encoding process. The JPEG method divides up the image into 8.times.8 pixel blocks 20, and then calculates the discrete cosine transform (DCT) of each block 21. The discrete cosine transform (DCT) helps separate the image into parts (or spectral sub-bands) of differing importance (with respect to the image's visual quality). The DCT is similar to the discrete Fourier transform: it transforms a signal or image from the spatial domain to the frequency domain. A quantizer rounds off the DCT coefficients according to the quantization matrix 22. This step produces the "lossy" nature of JPEG, but allows for large compression ratios. JPEG compression techniques convert these coefficients to a binary data stream. In this encoding process 23, JPEG's compression technique uses a variable length code on these coefficients, and then writes the compressed data stream 24 to an output file. For decompression, JPEG recovers the quantized DCT coefficients from the compressed data stream, takes the inverse transforms and displays the image.

FIG. 2 illustrates a more detailed description of the JPEG encoding process. As shown, in the JPEG compression method implementing sequential encoding, the original image is divided into blocks of pixels, each block typically containing 8.times.8 or 16.times.16 original image samples 25. Each 8.times.8 block of pixels is input to a DCT-encoder element 26 having a forward discrete cosine transform processor 27 that performs a Discrete Cosine Transform (DCT) on each pixel block. This transformation produces a representation of the input block as DCT coefficients corresponding to frequencies and amplitudes, rather than corresponding directly to color information. These coefficients are then quantized, or rounded off, by a quantizer element 28 in accordance with a quantization table 29, and DC coding is performed that employs a difference algorithm over all quantized blocks in the image, in a selected scan order. This difference algorithm subtracts a "DC" or zero frequency term corresponding to the mean pixel value of a block, from the DC term of the preceding block. The difference coefficients are then scanned in a different order, such as a zigzag order, and the non-zero coefficients (i.e., blocks in which a difference from the preceding block occurred) are coded to indicate the number of preceding zero coefficients (i.e., the number of pixel blocks in which no change occurred) and also the value of the non-zero difference. An additional compression step known as entropy encoding is performed by encoder element 30 to achieve a more compact coding of the quantized DCT elements. Entropy encoding schemes specified by the JPEG standard include Huffman coding and arithmetic coding, with the optional implementation of entropy encoding tables 31. The output 32 of the DCT encoder 26 is a data stream of compressed image data.

It should be understood that the key feature of JPEG compression is that an image is first segmented into disjoint 8.times.8 pixel blocks, each of which is replaced by its 2D DCT. In such a representation, the high frequencies tend to have very small coefficients enabling JPEG quantization to drive most of these coefficients to zero. This enables fewer bits to be stored after encoding.

Decompression is performed by reversing the compression process, and thereby producing the displayable image. As shown in FIG. 3, this typically involves inputting the compressed image data 33 into a DCT decoder 34 including an entropy decoder block 35 for decoding the compressed image data stream, e.g., in accordance with a Huffman decoding technique. At the output of the entropy decoder 35 the same data structure that the encoder 26 had at the end of the DCT transform is created. Then, a dequantization block 36 for dequantizing the image samples, and an inverse discrete cosine transform processor 37 for performing an inverse discrete cosine transform taking the decoded 64 DCT coefficients and reconstructing the original image.

As is known, the usefulness of decompression algorithms is determined by the number and the speed of mathematical computations performed to obtain the identifiable decompressed image. Typically, in image searching applications, it is required that each image is fully decompressed before the target image is located, which is a costly proposition as many computations are required to achieve full decompression.

One image application that incorporates decompression for storage purposes is slide presentations. For example, a user can assume that a server stores a repository of 1,000,000 PowerPoint slides previously exported from PowerPoint into the JPEG graphical images format. In addition, for those slides, assume there is already a function that bookmarks these slides and then automatically brings them down to a user PC and brings them into the PowerPoint program. At this point, the user needs to know of any Hotspots that were in the original slide before decompression that may not included in the slides brought to the user. This information could have been lost during the compression and decompression process. As previously mentioned, Hotspots are areas on an image that link the image to executable instructions for specific operations. For example, the icons on a desktop would be Hotspots. Without knowledge of the layout of an original slide, a user may not know that some Hotspot or other information from a slide may have been lost during the compression and transfer procedures.

The current state of the art implementation of hotspot hyperlinks comprised of (usually underscored) text strings is quite simple, the implementation of hotspots made up of pixel areas on an image is a bit more complex as a tool is required for the definition of the hotspot areas on the image. There remains a need for a method and system to track hotspot information on an image and include the hotspot information inside the actual image file to make it a complete navigation vehicle.

SUMMARY OF THE INVENTION

It is an objective of the present invention to provide a method and system to distribute hotspot (hyperlink) information for a graphical image file as a part of the actual graphical image file.

It is a second objective of the present invention to provide a method and system to append information to a graphical image stored in an image file format such as a JPEG file using a JEPG format.

It is a third objective of the present invention to provide a method and system for appending graphical information to the end of a file stored in a file extension format.

It is a fourth objective of the present invention to provide a method and system to store graphical information about the contents of a graphical display file such as a presentation file that has been compressed and stored in a graphical image file format.

It is a fifth objective of the present invention is to provide a method and system to locate information about the graphical contents of a presentation slide stored in an image file format.

The present invention provides a method and system to append information to an image file containing a stored graphical image. The appended information relates to the contents of the graphical image. This information can include the physical coordinates of a hotspot on the image. One example of an image file format is a JPEG format. Using the JPEG format as an example, in the process of the present invention, there is the creation of an initial JPEG file containing a stored image. The stored image could be any graphical file. During the creation of the graphical file through software modules (such as a PowerPoint file or Freelance Graphics file), the user can insert images, other objects or text onto the file. Some of the objects (referred to as "Hotspots") can contain hyperlinks to other files or other system resources. The graphical software stores information related to every object on the graphical file.

During the process of converting a graphical image file to a JPEG file, the present invention takes the information concerning 'Hotspots' on the graphical file and generates an appendix to the created JPEG file containing this 'Hotspots' information. In this process, the method of the present invention first reads the original length of the JPEG file. The present invention then attaches the appendix containing the 'Hotspots' information to the JPEG file. In this way the length of the JPEG file is modified to show the addition of the attached information.

The present invention also provides a method and system to decode the information in the extended image file. During the decoding of the extended image file, this method first reads the length of the appended file. The next step is to subtract the number of "n" bytes to find the length of the original image file. Once the knowledge of original image file is obtained, it is possible to get down to the start of the information that had been appended to the original file. The method then decodes the remaining appended extension information.

The present invention enables a user to secure vital information related to a graphical image during the conversion of the image into an image file format. The information contained in the appendix can be from any object type on a presentation slide generated with tools such as Microsoft PowerPoint or Lotus Freelance Graphics, or it can be an image area for example in pixel coordinates defined with an external tool.

Applications of this invention are not limited to the World Wide Web. The invention may be just as useful for any computer application programs with a need to allow a pointing device to point at areas on images and hereby present further information related to the image.

This invention is based on the idea of storing that further information inside the actual image or of storing hyperlinks to further information inside the actual image. If Web browsers such as Microsoft Internet Explorer or Netscape Navigator were enhanced to become capable of executing hotspot information previously stored inside an image file, the distribution of hotspot information for a graphical image would be dramatically simplified.

A special way of displaying further information about an image or a portion of an image is the use of popup images when the mouse is over certain areas of the image. These popup images may again be encoded using the method of this invention, so when the mouse is over certain areas of the popup image new images may popup. In this way large hierarchical cascading menus can be produced and stored inside one single image file. The subject of popup images or popup text for hotspots is one of the areas where the lack of compatibility between different web browsers make up a significant challenge and significant extra cost to development projects. Further, the HTML and JavaScript code necessary to display large hierarchical cascading menus in a WebBrowser is voluminous and complex, while the method of this invention needs no transmission of code, only data.

The use of the present invention requires decoding capabilities at the receiving computer, for example, a Web Browser Plugin if the native browser does not (yet) have the ability to do the decoding of Hotspots. The present invention also can be used in a special purpose computer application program environment that has been developed including the capability to interpret the Hotspot information appended to image files.

DESCRIPTION OF THE DRAWINGS

FIG. 9 is an illustration of a record layout for a "Hotspot" or other entity on a graphical image.

FIG. 10 is an expanded sample illustration of a record layout for a "Hotspot" or other entity on a graphical image.

FIG. 11 is an illustration of a record layout for a Popup image entity for a graphical image.

DETAILED DESCRIPTION OF THE INVENTION

Figure 1:
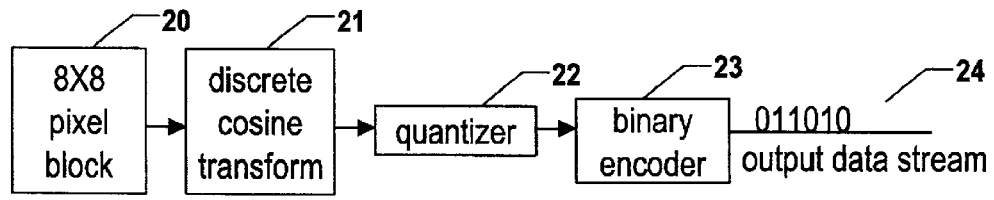
FIG. 1 is an overview of the process for converting a graphical image to a JPEG file format.
Figure 2:
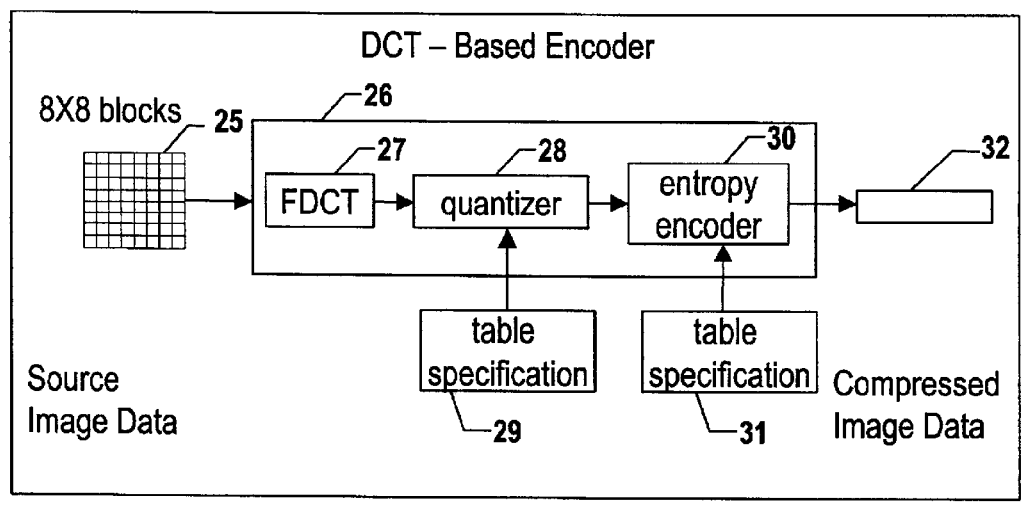
FIG. 2 is an expanded view of the process for compressing an image into the JPEG file format.
Figure 3:
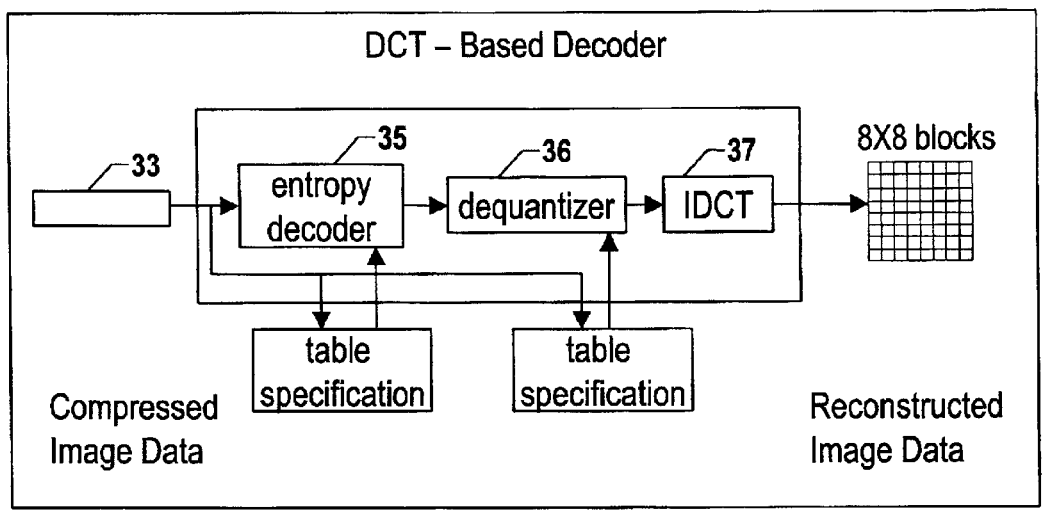
FIG. 3 is an expanded view of the process for decompressing an image that has been compressed into a JPEG file format.
Figure 4:
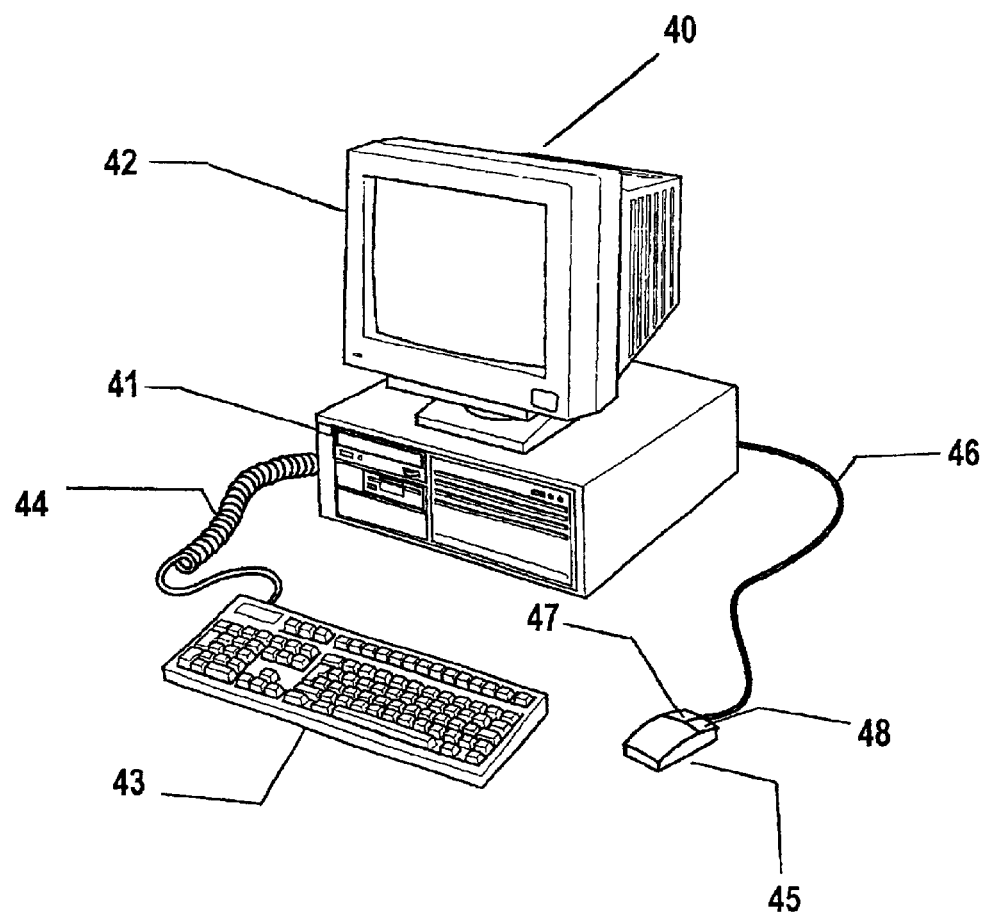
FIG. 4 depicts data processing equipment a system that can be utilized to implement the present invention.

With reference now to FIG. 4, there is depicted a pictorial representation of data processing system 40 which may be used in implementation of the present invention. As may be seen, data processing system 40 includes processor 41 that preferably includes a graphics processor, memory device and central processor (not shown). Coupled to processor 41 is video display 42 which may be implemented utilizing either a color or monochromatic monitor, in a manner well known in the art. Also coupled to processor 41 is keyboard 43. Keyboard 43 preferably comprises a standard computer keyboard, which is coupled to the processor by means of cable 44. Also coupled to processor 41 is a graphical pointing device, such as mouse 45. Mouse 45 is coupled to processor 41, in a manner well known in the art, via cable 46. As is shown, mouse 45 may include left button 47, and right button 48, each of which may be depressed, or "clicked", to provide command and control signals to data processing system 40. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 40 may be implemented utilizing a personal computer.

Figure 5:
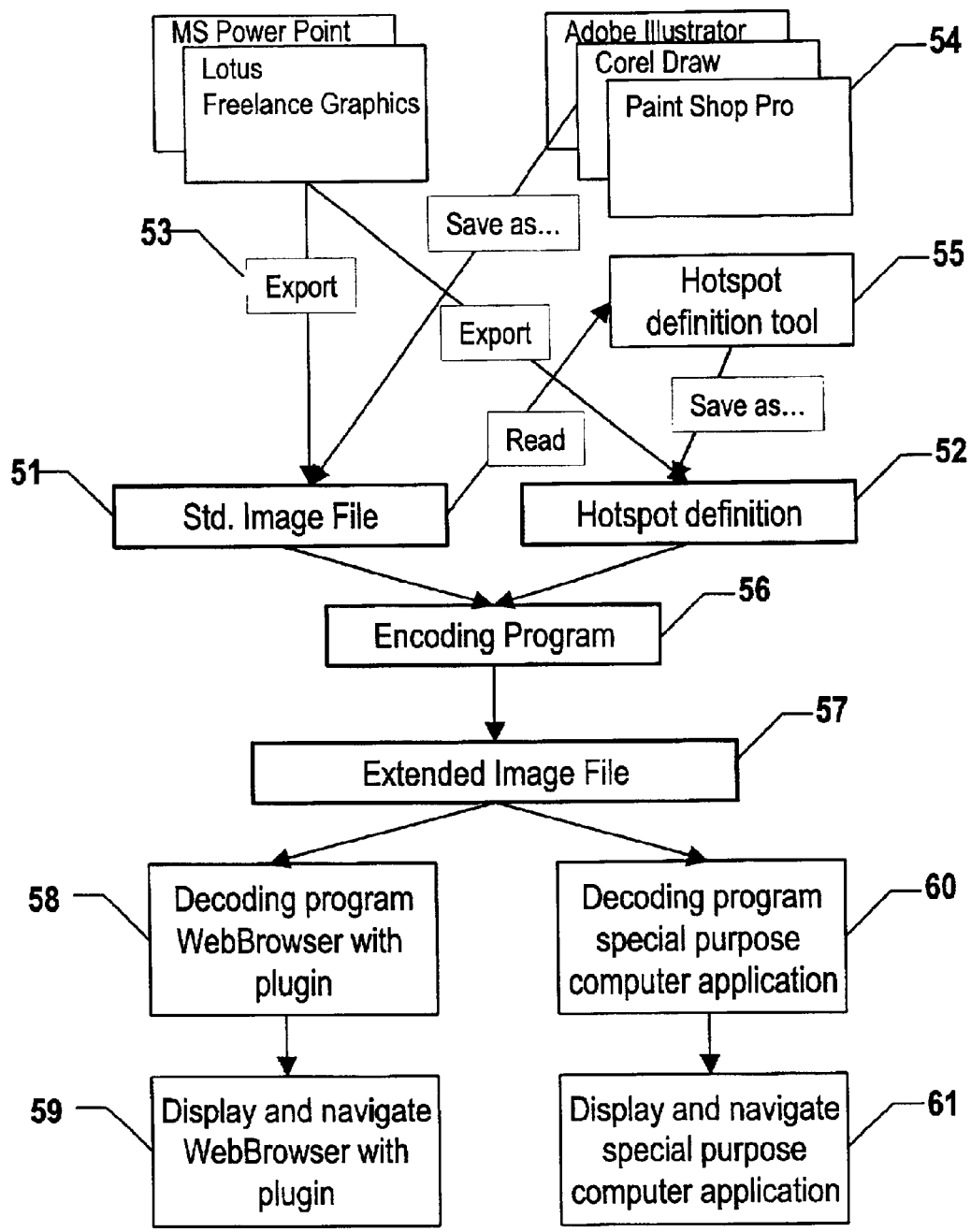
FIG. 5 is a diagram of the architecture of the software implemented in the operation of the method of the present invention.

The description of the present invention will be with reference to the particular graphical file format known as "JPEG". However, the techniques of this invention can be implemented with other graphical file formats as well. FIG. 5 illustrates the architecture of the software implemented in the operation of the method of the present invention. The software system architecture as illustrated creates a standard image and an extension to the image that defines 'hotspots' on the image. As shown, the software can include presentation tools 50 such as Microsoft PowerPoint® or Lotus Freelance Graphics® software modules. These presentation tools 50 have the ability to create a graphical image and to define 'hotspots' on the image. These tools can also export the graphical image file 51 and hotspot definition information 52 such as coordinates of the image. The export software 53 transfers the standard image file from the presentation tools to an encoding module. The conversion of the image to a standard image file such as a JPEG file can occur within the presentation tool software and prior to transferring the file.

An alternative architecture comprises graphics tools 54. These tools are capable of creating graphical images. However, these tools do not define hotspot information on the created image. The 'save as' function corresponds to the export function in the presentation tools. Module 55 is a tool that defines hotspots on an image. In the diagram, the Hotspot definition tool reads the standard image file and a user manually defines hotspots on the image. At this point, there is a record containing standard image file 51 information and a record containing hotspot definition file 52 information.

The encoding program 56 combines the standard image file and the hotspot definition files. In the present invention, this combination occurs by creating the extension from the hotspot file and appending that extension to the standard image file 51. The appending procedure results in the extended file image 57. The next set of software modules 58 decodes an extended image file. This software could be located in another location on a computing network. As a result, the decoding program could receive extended image files over a global computing network such as the internet. The decoding software could be plugin program contained in a WebBrowser. This decoder program would have the ability to read and interpret the standard image file information and hotspot information from one file. The current decoding procedure requires that the image file information and hotspot information be in separate files in order for the WebBrowser to read the information. Since the encoded information would be in one file, it would be necessary for a WebBrowser to have software that could read the information from a single file. This plugin module would decode the extended image file and divide the file into the original image and hotspot information. Software module 59 would display and navigate the original image as desired by the user. As an alternative, the decoding software could also be a special purpose computer programs 60 and 61 can decode and display the information in the original graphical image.

Figure 6:
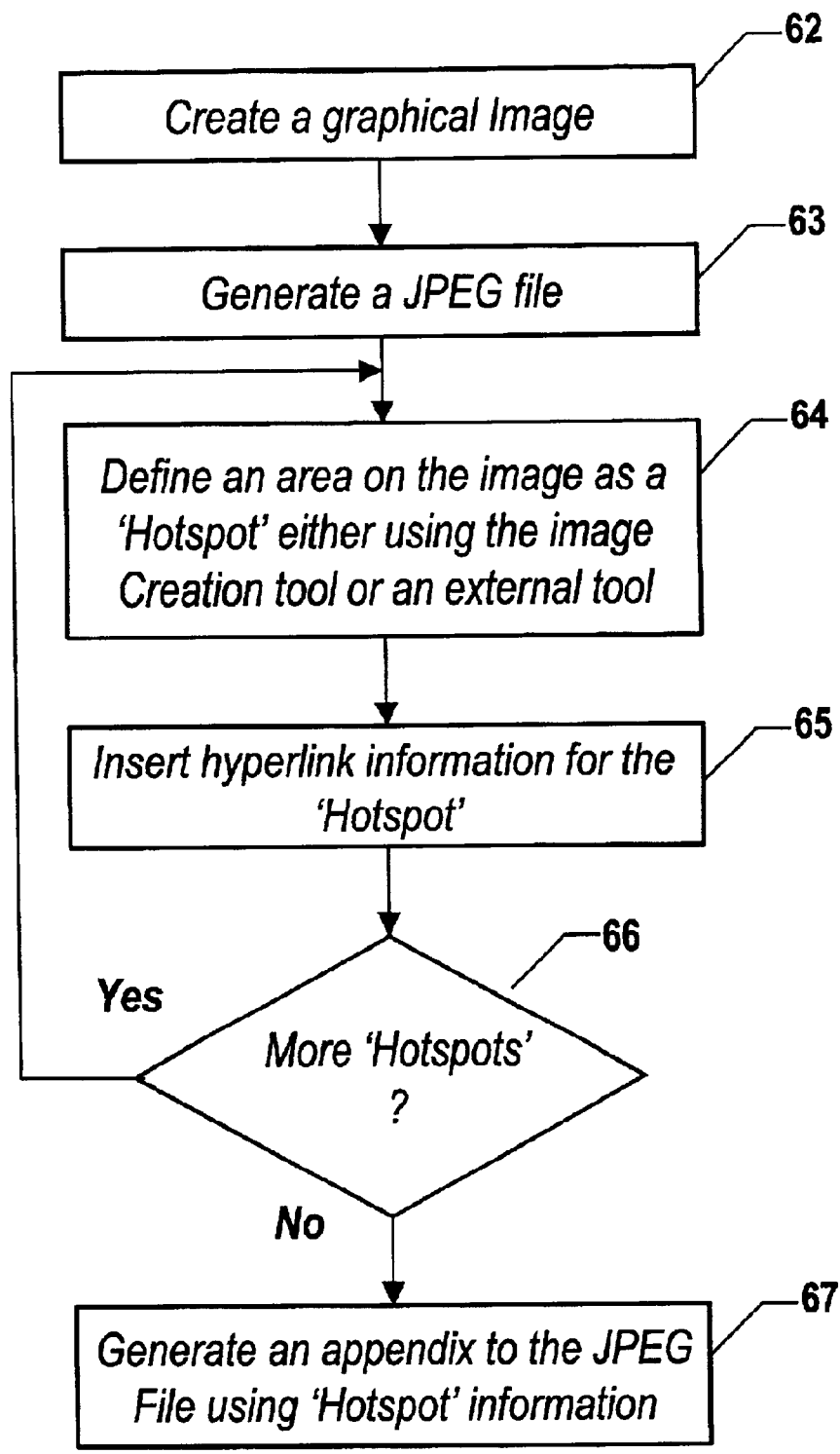
FIG. 6 is a flow diagram of the general process for creating and appending an extension to a JPEG file.

FIG. 6 illustrates the general steps in the preferred implementation of the method to create an appendix to a JPEG file. The initial step in this process is the creation of a graphical image in step 62. This image can be a PowerPoint® or Lotus Freelance type presentation slide or an image created with any graphics tool. The slide image may contain several objects such as text and images. Objects may have hyperlinks (hotspots), popup images, or popup text. The next step 63 is to create a JPEG file. As previously stated, this JPEG file could be any other graphical image file such as GIF format. There are many standard graphical formats that are known web browsers and graphic tools. Step 64 defines an area on the image as a 'Hotspot". This step 64 can be performed using the image creation tool or an external tool. In graphical creation software such as PowerPoint, the user can define a 'hotspot' area on the image during the creation of the image. External software modules that can perform this task include tools without image editing capabilities but with capabilities for defining areas on an image e.g. in terms of pixel coordinates and with capabilities of storing hyperlink information for each area then becoming hotspots. After the defining of the 'hotspot', step 65 inserts hyperlink information for the 'hotspot' into the graphical image description. This information would contain instructions on things such as the size of the 'hotspot', the position of the 'hotspot', a target file or URL to go to when a user clicks the 'hotspot'. This insertion of information is done through conventional methods. The next step 66 is to determine whether there are more hotspots on the image. If there are additional hotspots, the process would return to and repeat step 64 for the additional hotspot. Following this insertion of hyperlink information, step 67 generates an appendix to the JPEG file created in step 63 using the defined 'hotspot' information. This appendix will contain information about a specific 'hotspot' contained on the original graphical image file.

Figure 7:
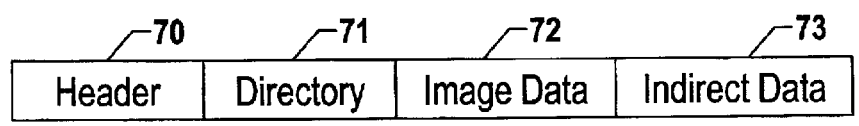
FIG. 7 is a view of a standard information record used to store information about the compressed contents of an image in an image file.

FIG. 7 illustrates the configuration of information that describes the objects contained in an original standard JPEG file. The information is stored in the form of a record. As shown, the record has four fields. The Header field 70 contains general introductory information that identifies this record as a JPEG file. The Directory field 71, the Image Data field 72, and the Indirect Data field 73 contain internal information for the JPEG file. The detailed description of these fields is outside the scope of this invention.

Figure 8:
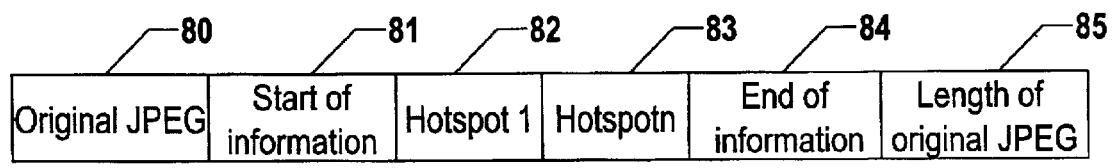
FIG. 8 is an expanded view of an information record having multiple fields and pointers containing appended information from a file that is stored in a compressed JPEG format.

FIG. 8 illustrates the configuration of information in an appended JPEG file of the present invention. Field 80 is the entire original JPEG record described in FIG. 7. Field 81 is the start of information field for the appended information. This field indicates that the information to follow is appended to the JPEG file. Fields 82 and 83 contain information about various 'hotspots' in the record. The number of substantive fields in an appended extension can vary depending on the content of an original graphical image file. The end of information field 84 signifies the end of the appended information. The length of original JPEG file is stored in field 85.

It is essential for a later decoding process that a standard JPEG file without any hotspot information appended to it can be differentiated from a JPEG that has undergone the encoding process of FIG. 8, unless all JPEGs for a specific computer application environment have undergone the encoding process even if they had no hotspots on them. In that case all JPEGs would have at least field 80, 81, 84, 85.

FIG. 9 illustrates the type of information contained in the 'hotspot' field 82. In the 'hotspot' record, there are parameter entries, type and size entries for each parameter and values for each parameter. In this record there is a LENGTH parameter with a size entry of S,8 which represents 8 bytes. The 'S' represents the fact that this parameter is a string. This entry indicates the length of the remainder of the 'hotspot' information. The "values" entry shown as '00000xxx' indicates these 8 bytes for the length of the information. The '8' represents the length of the string. The next parameter is the TYPE of information in the record. This parameter is indicated by the S,2 notation. Again, the 'S' represents the fact that this parameter is a string. The '2' represents the length of the string. The value of this parameter is indicated as '01'. The next four parameters X1, Y1, X2, and Y2 represent position coordinates for the 'hotspot'. These parameters have values of size four and indicated by the notation S,4. The parameter 'URL LENGTH' is the length of any linked URL address. The parameter is indicated by the type S,4. The last shown parameter is the actual URL. This parameter has an S notation. It should be notated that there is no standard notation and that the notation can vary from one graphical file image to another graphical file image.

The concern of differentiating a standard JPEG file from a JPEG file with extended hotspot information relates to the statistical question: Could a standard JPEG file by coincidence have a consistent hotspot definition structure at the end of the file? It is however possible with 100% certainty to differentiate standard JPEG files from JPEG files with extended hotspot information. A way of doing that with 100% certainty requires the decoding program to know the internal format of a standard JPEG file, say field 80, which is made up of fields 70, 71, 72 and 73. In that way the decoding application would know the entire size of 80. But this method is more sophisticated than desirable. For the sake of keeping the decoding program simple and allowing the invention to work in general with other graphical file formats than JPEG, more or less redundancy could be added to achieve a detection accuracy very close to 100%. Already the encoding scheme of FIG. 9 is most unlikely to hit by random. The decoding program may execute a number of validation rules, e.g. that all characters are within certain ranges in the ASCII character set, that LENGTH does not reach beyond the end of file, that TYPE matches a predefined set of types, that X2>X1, that Y2>Y1, that the hotspot definition scheme is followed by another hotspot definition scheme or field. But if even more certainty is required, redundancy can easily be added for example a field could be encoded with more or less sophisticated checksums for the extended portion of the file.

FIG. 10 illustrates a completed 'hotspot' record example. As shown, the LENGTH parameter has a size of 8 bytes and a value of '00000064', which is the total length in bytes of the hotspot record. The TYPE parameter has a size of S,2 which indicates 2 bytes and has a value of '01'. Each position coordinate X1, Y1, X2, and Y2 has a size of 4 bytes and has values of '0264', '0512', '0606' and '0042' respectively. The URL LENGTH parameter has a size notation of S,4 and a value of '0042' which is the length of the URL string. The record has a URL address of '7652cedc868ef8ef6c12568bd0036a0f5a274.html' as indicated in the values field.

FIG. 11 illustrates an example of a popup image record. Popup image records are not shown in FIG. 8. But a popup image record could optionally be inserted after any hotspot definition record in FIG. 8. This popup image can pop up on the display when the mouse for a system is over the hotspot on the graphical image. This popup image file is usually another original graphics file. Similar to the 'hotspot' field, the popup image has parameters, size and type and value fields. In this record there is a LENGTH parameter with a size entry of S,8 which represents 8 bytes. The "values" entry shown as '00000xxx' indicates these 8 bytes for the length of the information. The next parameter is the TYPE of information in the record. This parameter is indicated by the S,2 notation. The value of this parameter is indicated as '02'. The '02' notation indicates that this record is a popup image instead of a 'hotspot' as indicated by the '01' notation. The FILENAME LENGTH is the next field. This field has a type and size indicated by the notation S,4. This field is similar to the URL LENGTH field in FIG. 10 and will contain in the values parameter a number indicating the length of the filename. The FILENAME field has a type and size notation of 'S'. This parameter is comparable to the URL parameter. This value field will contain the original filename of the popup image file from before it was appended into the extended JPEG file. This filename is not required for this invention, but the field is available for file management purposes. The last popup image parameter is FILE DATA parameter. This parameter has a type designation of B. This notation indicates that the data is binary. The length of the binary data can be deducted from the LENGTH field subtracted by the length of the other fields. The popup image may again be encoded using the method of this invention, so when the mouse is over certain areas of the popup image new images may popup. Using this principle in a recursive way, large hierarchical cascading menus can be produced and stored inside one single image file. Optionally fields could be added to indicate whether the popup image should popup relative to the hotspot coordinates or relative to the actual mouse coordinates. In both cases another parameter could indicate a desired displacement offset to these coordinates.

Figure 12:
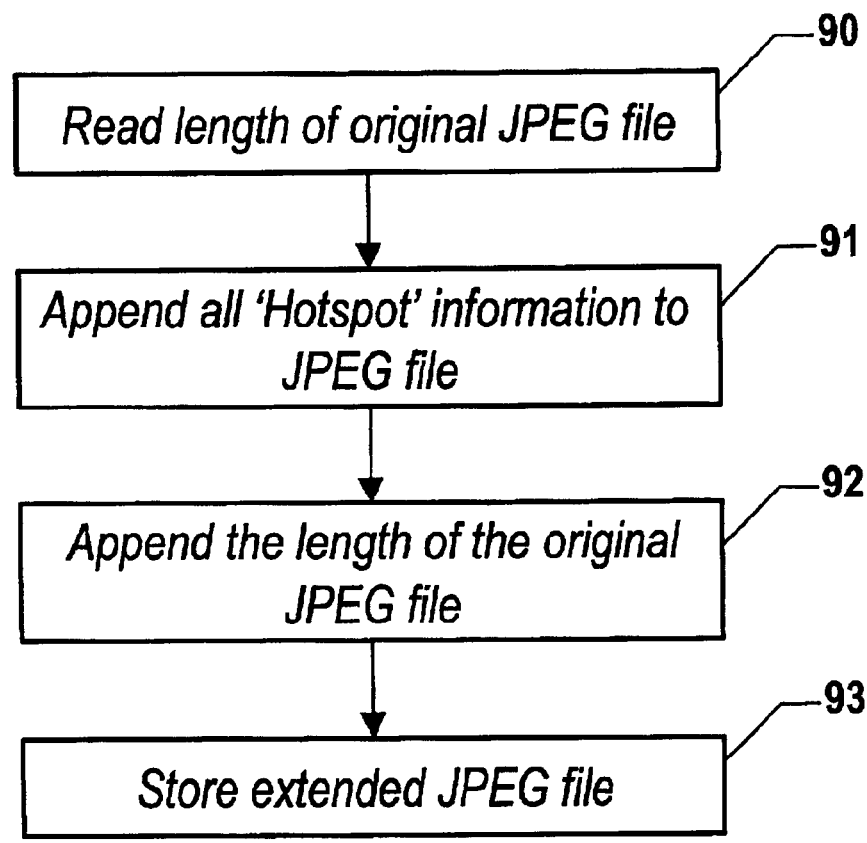
FIG. 12 is a flow diagram of a process to append information to a graphical image file such as a JPEG file.

FIG. 12 illustrates a flow diagram of the steps involved in appending a record such as a 'hotspot to a JPEG file. The initial step 90 in this process is to read the length of the original JPEG file. The length comprises the total length of all of the fields in a JPEG record such as the one illustrated in FIG. 7. Step 91 appends the information for all 'hotspots' defined for a graphical image to the original JPEG file. Step 92 appends the length of the original JPEG file to the end of the newly appended JPEG file. This appending process is in the form of adding an additional field to the extended JPEG file as field 85 shown in FIG. 8. The final step 93 in the appending process is to store this newly appended record.

Figure 13:
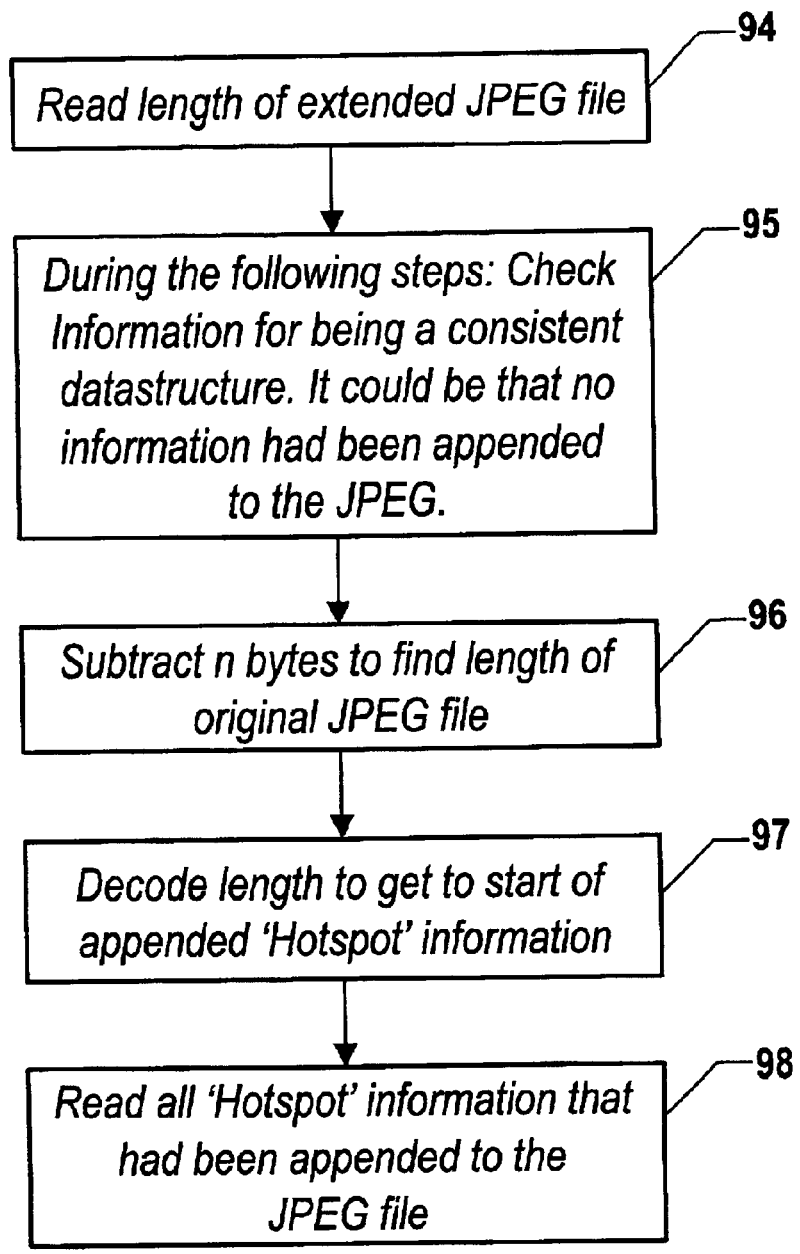
FIG. 13 is a flow diagram of a process to read and decode information appended to a graphical image file such as a JPEG file.

FIG. 13 illustrates the steps involved in decoding and reading the appended 'hotspot' information from the JPEG file. This method in FIG. 13 is the interpretation software for this method. In this method, step 94 reads the length of the total extended JPEG file. The next step 95 is to determine whether there has been any information appended to an original JPEG file. Step 95 is meant to cause a break during decoding in 96, 97, 98 if the record structure turns out to be inconsistent. In that case it can be concluded that the JPEG is an original standard JPEG with nothing appended to it. Step s 96 subtracts n bytes from the end of file to read the length of original JPEG field 85 to determine the length of the original JPEG file. The next step 97 is to use that information to get to the start of the information in the JPEG extension. Step 98 reads all 'hotspot' information that is appended to the JPEG file.

It is important to note that this invention has been described in the context of a specific graphical file format (JPEG) and with regard to presentation slides. The techniques of this invention can be implemented any graphical file format. It is also important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

Having thus described the invention, what we claims as new and desire to secure by Letters Patent is set forth in the following claims.

I claim:

1. A method for appending information to a graphical image file comprising the steps of:
    creating a graphical image, said image containing at least one object;
    creating a graphical image file of said created graphical image;
    defining an area on the created image as a hotspot area;
    inserting the information about the defined hotspot area into a data record; and
    generating an appendix to the graphical image, by reading the length of the graphical file, appending the data record containing the information about the defined hotspot area to the graphical image file and thereby creating a new graphical image file, and appending the length of the new graphical image file to the end of the new file, the generated appendix being the data record containing the information about the defined hotspot area.

2. The method as described in claim 1 wherein the length of the new graphical image file is stored in a field at the end of the graphical image file.

3. The method as described in claim 1 further comprising after said storing step, the step of decoding the data in the appendix to the graphical image file.

4. The method as described in claim 3 wherein said decoding step further comprises the steps of:
    reading the length of the new graphical image file including the appendix portion of the file;
    determining whether this graphical image file has an appendix;
    determining the length of the original graphical image file when there is an appendix;
    determining the starting location of the appended information; and
    reading all information contained in the appended portion of the graphical image file.

5. The method as described in claim 4 wherein said length determination step comprises subtracting n number of bytes from the length of the new graphical image file.

6. The method as described in claim 5 wherein said start location determination step comprises using the length of the new graphical image file obtained from said length determination step to find a start of information field in the graphical image file.

7. A computer program product in a computer readable medium for appending information to a graphical image file comprising:
    instructions for creating a graphical image, said image containing at least one object;
    instructions for creating a graphical image file of said created graphical image;

instructions for defining an area on the created image as a hotspot area;

instructions for inserting the information about the defined hotspot area into a data record; and instructions for generating an appendix to the graphical image file comprising instructions for reading the length of the graphical image file, instructions for appending the data record containing the information about the defined hotspot area to the graphical image file and thereby creating a new graphical image file, instructions for appending the length of the new graphical image file to the end of said new file and instructions for storing the new graphical image file, the appendix being the data record containing the information about the defined hotspot area.

8. The computer program product as described in claim 7 further comprising instructions for appending the generated appendix to the graphical image file.

9. The computer program product as described in claim 7 wherein the instructions for defining an area on the created image as a hotspot area further comprises instructions for using an image creation tool.

10. The computer program product as described in claim 7 wherein the instructions for defining an area on the created image as a hotspot area further comprises instructions for using an external tool.

11. The computer program product as described in claim 7 wherein said storing instructions further comprise instructions for storing the length of the new graphical image file at the end of the graphical image file.

12. The computer program product as described in claim 7 further comprising after said storing instructions, instructions for decoding the data in the appendix to the graphical image file.

13. The computer program product as described in claim 12 wherein said decoding instructions further comprise:

instructions for reading the length of the new graphical image file including the appendix portion of the file;

instructions for determining whether this graphical image file has an appendix;

instructions for determining the length of the original graphical image file when there is an appendix;

instructions for determining the starting location of the appended information; and instructions for reading all information contained in the appended portion of the graphical image file.

14. The computer program product as described in claim 13 wherein said length determination instructions further comprise instructions for subtracting n number of bytes from the length of the new graphical image file.

15. The computer program product as described in claim 14 wherein said start location determination instructions further comprise instructions for using the length to find a start of information field in the graphical image file.

* * * * *